United States Patent [19]
Bowles

[11] Patent Number: 5,333,405
[45] Date of Patent: Aug. 2, 1994

[54] SOFT PLASTIC FISHING LURES CONTAINING MICROENCAPSULATED LIQUID FISH ATTRACTANT

[76] Inventor: Thomas J. Bowles, P.O. Box 6034, Dayton, Ohio 45405

[21] Appl. No.: 2,207

[22] Filed: Jan. 8, 1993

[51] Int. Cl.$^5$ ............................................. A01K 85/01
[52] U.S. Cl. .................. 43/42.06; 43/42.24; 43/42.33
[58] Field of Search ............... 43/42.06, 42, 44.99, 43/42.24, 42.31, 42.32, 42.33, 42.24, 42.06; 426/1

[56] References Cited

U.S. PATENT DOCUMENTS

| | | | |
|---|---|---|---|
| 2,827,376 | 3/1958 | Breuer | 43/42.06 |
| 2,937,467 | 5/1960 | Capps | 43/42.06 |
| 3,359,114 | 12/1967 | Witteman et al. | 426/1 |
| 3,437,488 | 4/1969 | Humphreys | 426/1 |
| 3,579,895 | 5/1971 | Orn | 43/42.06 X |
| 3,705,465 | 12/1972 | Charney | 43/42.33 X |
| 3,879,883 | 4/1975 | Strader | 43/42.32 |
| 3,971,152 | 7/1976 | Husson, Jr. | 43/42.06 |
| 3,988,479 | 10/1976 | Stephan et al. | 426/1 |
| 4,927,643 | 5/1990 | D'Orazio et al. | 43/42.06 X |
| 4,956,934 | 9/1990 | Dahl | 43/42.33 X |
| 5,089,277 | 2/1992 | Prochnow | 426/1 |

Primary Examiner—P. Austin Bradley
Assistant Examiner—Jeanne M. Elpel

[57] ABSTRACT

A soft plastic fishing lure containing particulate microencapsulated liquid fish attractant. Characteristically the soft plastic component of the fishing lure is the major component and is a heavily plasticized vinyl plastisol. Incorporated (blended) with this vinyl plastisol is a minor component containing particulate discrete microencapsulated particles (individual microcapsules), each having a spherical cell wall of a water-soluble gradually dissolving natural or synthetic coacervated polymer and an internal phase of liquid fish attractant, and agglomerates of such individual microcapsules associated in a tacky, viscous, continuous, substantially water-soluble polymeric binder. The predominant portion of individual microcapsules range in particle size from about five microns to about 100 microns, and whose mean individual particle size ranges from about thirty to about seventy microns.

12 Claims, 1 Drawing Sheet

SOFT PLASTIC FISHING LURES CONTAINING MICROENCAPSULATED LIQUID FISH ATTRACTANT

BRIEF DESCRIPTION OF THE INVENTION

This invention is directed to very soft and soft plastic fishing lures containing particulate microencapsulated liquid fish attractant. Characteristically the soft plastic component of the fishing lure is the major component and is a heavily plasticized vinyl plastisol. Incorporated (blended) with this vinyl plastisol is a minor component containing particulate discrete microencapsulated particles (individual microcapsules), each having a spherical cell wall of a water-soluble gradually dissolving natural or synthetic coacervated polymer and an internal phase of liquid fish attractant, and agglomerates of such individual microcapsules associated in a tacky, viscous, continuous, substantially water-soluble polymeric binder. The predominant portion of individual microcapsules range in particle size from about five microns to about 100 microns, and whose mean individual particle size ranges from about thirty to about seventy microns.

Characteristically, the soft lures of this invention are made by mixing the microencapsulated component including the continuous binder with the highly plasticized vinyl plastisol and molding or otherwise forming same.

Additionally, the formed lures can contain a dried exterior coating containing such microcapsules suspended in such continuous polymeric binder.

The terminology "soft[/very soft]" is used herein to express the comparative softness to the touch as reflecting the concentration of plasticizer contained in the lure.

BACKGROUND OF THE INVENTION AND PRIOR ART

A wide variety of fishing lures are available to the fisherman. Basically fishing lures are of two types: The hard fishing lures, such as those constructed of wood, metal or hard plastic materials; and the soft lures, viz., those lures constructed of soft plastic materials which are readily moldable and can be tailor-made for fishing by insertion of a variety of hooks therein.

In addition to the use of this wide variety of fishing lures, various coating materials are available to provide a fish attractant scent in addition to the visual appeal presented by each individual fishing lure. The lure with such a fish attractant material coated thereon is then an odor-bearing lure.

There have been provided a variety of fish attractant coating compositions intended to be applied to both hard and soft fishing lures to enhance the strikeability of the lure by fish. Most of these fish attractant coating compositions have disadvantages attendant to their use. For example, some of the compositions are oily compositions which, when applied to a lure which is subsequently put into the water, quickly float off the lure to limit the duration of olfactory attractiveness of the lure to the fish. Unfortunately, the fisherman is basically using the lure to rapidly distribute chum in and above the area where the lure is cast. Such oily fish attractants, not being retained on the lure, quickly rise to the surface of the water and float away in the current present where the fisherman is fishing.

Some other lures coated with releasable active materials are wax-based and therefore do not allow for easy dissemination of the active fish attractant to the interface of the water with the lure.

Other odoriferous fish attractants are solids which cannot be readily applied onto the lures. Such solid odoriferous materials are characteristically cast or sprinkled on the water in the area where the fishing lures are cast. This, too, unfortunately results in merely providing chum on the surface of the water in an area where the hooks and the lure is located far below.

Other lures are of the type wherein the fish attractant material is distributed throughout a matrix of water-soluble polymer material, for example by being molded therein, to allow for release of such fish attractant into the water upon dissolution of the polymer matrix thereby resulting in leeching out of the fish attractant. Many of these lures take too long to permit the fish attractant material to be leeched out and delivered for practical use in attracting the fish.

Conversely, in other fish attractant-containing matrix lures, release of the active scent material is too fast, resulting in too early a presentation of the fish attractant material.

These and other shortcomings are by and large eliminated in accordance with the present invention which offers a combination of readily, quickly released liquid fish attractant scent and more gradually released microencapsulated liquid fish attractant scent in the same coating composition which is not oily and which when dried on the lure results in a dried film having sufficient durability to per, nit its use for as long as several hours of fishing. The dried film is retained on the lure when the lure is cast into the water and therefore results in a gradual presentation of the fish attractant material over a more extended period of time at the very location where the lure presents itself to the fish, viz., at the very location where the lure is located within the water as it is being retrieved by the fisherman.

U.S. Pat. No. 4,927,643 issued to V. T. D'Orazio, et al is directed to a water-soluble polymer fishing lure coating having an odoriferous fish-attractant material dispersed therein. A composition for application on the fishing lures to provide olfactory stimulation of fish includes a volatile organic solvent, a polymeric material dissolved in the solvent and capable of forming a water-soluble coating, and a fish attractant material dispersed in the solution. A method for imparting an olfactory stimulus to a fishing lure includes applying said composition onto the lure, preferably by spraying, dipping or brushing, and then exposing the lure to air for volatilization of the organic solvent and deposition of the coating.

U.S. Pat. No. 4,742,638 issued to D. J. Vobejda is directed to an artificial hollow body fishing lure which provides a means for containing a liquid scent and dispensing that scent in metered amounts as the lure is drawn through the water. The lure contains a propeller at its rear end which turns as the lure is pulled through the water. Turning of the propeller conveys the liquid scent contained within the hollow lure and disperses it into the water to attract fish to the lure.

U.S. Pat. No. 4,463,018 issued to W. E. S. Cart is directed to an artificial bait comprised of a tough, semi-rigid, flexible water-insoluble matrix material formed of hydrophilic macromolecular substances containing therein a fish attractant. The Carr baits are designed for placing on a hook and fishing in the same manner as is done with non-live natural baits.

U.S. Pat. No. 3,359,114 issued to F. Witteman, et al is directed to a composition for use as a fishing lure by attachment to a fishing hook. This composition contains a quantity of minute, buoyant, hollow microspheres, e.g., hollow glass microspheres, which are dispersed in a normally non-buoyant fishing bait material to produce sufficient buoyancy to cause the fish lure composition with hook to float. Suitable disclosed normally non-buoyant fishing bait materials are Velveeta cheese, American cheese, hamburger, and mashed salmon eggs.

U.S. Pat. No. 3,684,519 issued to E. S. Combs is directed to a fish bait made of comminuted organic tissue particles dispersed in a solidified polyacrylamide gel. When stored out of contact with water, the gel tightly compacts around the tissue particles and allegedly prevents biological degradation of the tissue. When immersed in water the gel swells to allow bacterial action to take place in the tissue. The tissue odor is released through the surrounding gel in the same manner as from tissue alone, and the gel is disclosed as protecting the tissue from decomposition.

U.S. Pat. No. 3,987,575 issued to T. Morita is directed to a fishing lure or plug device which contains self-chumming means for attracting fish to the lure for biting thereon. The lure is shaped like a bait fish or any usual shape of fish lure, spoon or the like, and has hooks attached to it, an eyelet means for attachment to a leader line to the fisherman or his reel. The lure body has a chamber formed therein for receiving a liquid container in the form of a vial or capsule containing a liquid such as fish oil, cod liver oil, or other fish-derived oil which is attractive to the fish being sought, the chamber being open at one or both ends with a retaining spring to retain the oil capsule therein, so that by puncturing the vial or capsule, the oil is dribbled out and entrained with the water to attract the fish.

U.S. Pat. No. 4,875,305 issued to J. O. Bridges is directed to a fishing lure having a fish-attractant body which is formed of a water-soluble polymer having a slow dissolution rate. The polymer contains a fish scent attractant which can be encapsulated, viz., trapped, within the polymer, e.g., fish or blood meal can be included in the polymer so that it will be slowly dispensed into the water as the polymer dissolves. The preferred polymer is polyvinyl alcohol having a preselected degree of hydrolysis of its ester groups to achieve the desired water-solubility rate, and optionally plasticized with glycerol. The attractant can be a sheet which has a plurality of parallel and co-extensive slits to provide parallel strips that depend from an unslit portion thereby permitting the sheet material to be wrapped about a lure body and secured in place so that the parallel strips extend rearly from the body, permitting them to undulate in the water as the lure is pulled through the water, simulating the swimming movements of a small fish. [Note FIG. 3]. Other embodiments include solid form lures shaped from polyvinyl alcohol which is gelled with a soluble borate.

It should be readily apparent from the foregoing that none of these patents discloses or suggests the soft and very soft plastic fishing lures containing a minor portion of particulate micro-encapsulated liquid fish attractant particles suspended or dispersed in a continuous, substantially water-soluble, polymeric binder blended with a major portion of a heavily plasticized vinyl plastisol to form fishing lures, preferably by molding. The lures of this invention achieve a combination of quick release of any fish attractant incorporated in said water-soluble polymeric binder, and gradual release of the fish attractant contained in said micro-capsules thereby offering a longer lasting presentation of the fish attractant at the exact location in the water where the lure is presented to the fish.

DETAILED DESCRIPTION OF THE INVENTION

Figure 1:
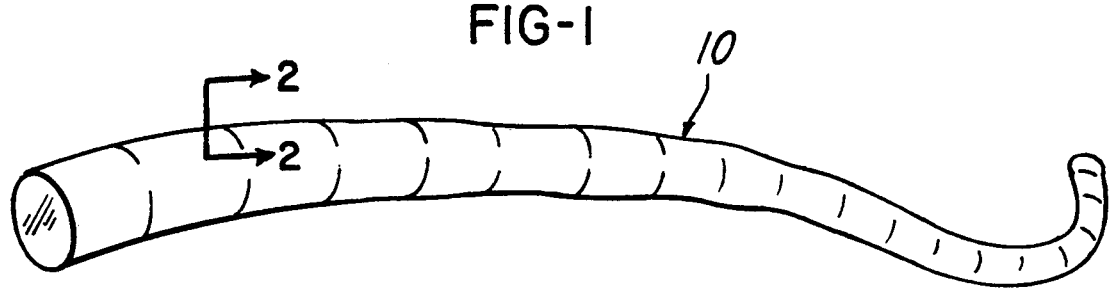
FIG. 1 is a perspective view of a typical soft fishing lure (worm) in accordance with this invention.
Figure 2:
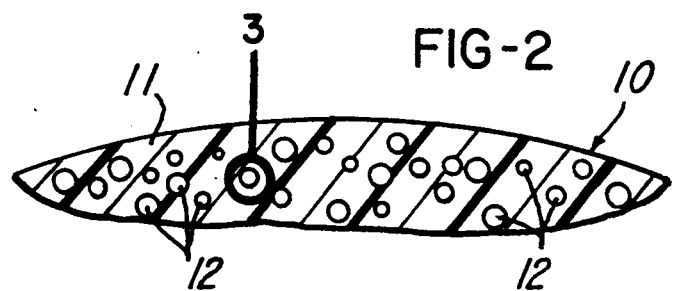
FIG. 2 is a greatly enlarged cross-sectional view taken along the lines 2—2 of FIG. 1.
Figure 3:
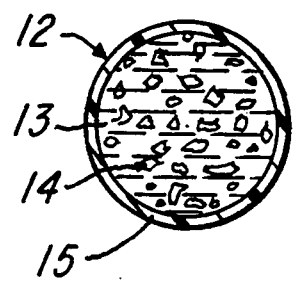
FIG. 3 is a greatly enlarged cross-sectional view of an individual microcapsule containing internal phase liquid fish attractant and other material.

As is apparent from FIG. 1-3 of the drawings, molded fishing lure (10) is composed of [very soft and] soft highly plasticized plastic material (11) and particulate microcapsules (12) having water-soluble, gradually dissolving natural or synthetic polymer cell wall (15) and liquid fish attractant internal phase material (13).

In accordance with one embodiment of the invention, solids (particulate material) (14) can be located within the internal phase liquid, as shown in FIG. 3.

Figure 4:
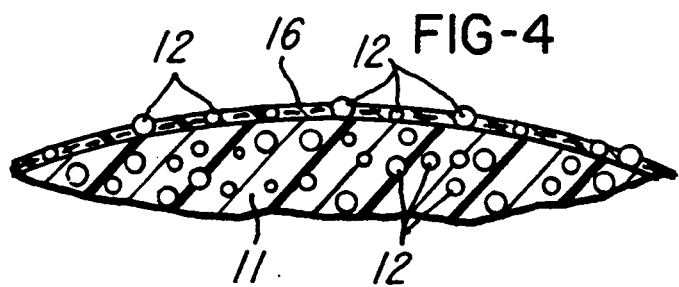
FIG. 4 is a view similar to FIG. 2 but having a dried exterior film (coating) of such microcapsules in a continuous polymeric binder.
Figure 5:
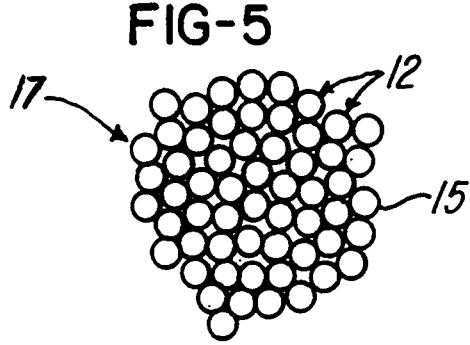
FIG. 5 is a perspective view showing an agglomerate (17) of individual microcapsules (12) adhered by their respective cell walls (15). The maximum particle size of the individual microcapsules are characteristically less than 100 microns.

As shown in FIG. 4, fishing lure (10) can also have a dry exterior surface film coating (16) which contains microcapsules (12) located therein. Coating (16) is composed of a tacky, viscous, continuous, substantially water-soluble polymeric binder, which when dried, results in an adherent film on the surface of lure (10).

Lure (10) is a soft to very soft molded body resulting from forming, e.g., molding [[1]] a major portion of a heavily plasticized polymer, e.g., a vinyl plastisol(s) with [[2]] a minor portion of a microcapsule-containing binder formulation of [{A}] microcapsules having a water-soluble natural or synthetic coacervated polymer cell wall as an external phase enclosing an internal phase of liquid fish attractant distributed within [{B}] a continuous, tacky viscous substantially water-soluble polymeric binder.

The highly plasticized vinyl plastisol [(1)] and microcapsules-containing binder formulation [(2)] are blended to achieve uniform mixing of both components prior to formation into an appropriate lure shape, such as the worm lure (10) shown in FIG. 1.

Characteristically the lure is formed by molding in accordance with known procedures for molding highly plasticized vinyl plastisols.

Typical lure shapes include worms, crayfish, minnows and other bait fish, frogs, eels, shrimp, lizards, squid, etc.

The specific molding procedures utilized will depend on the specific lure configuration to be produced, which in turn will dictate which specific vinyl plastisol formulation will be used. For example, lures such as lizards and squid use a different formula than more simple shapes, such as worms, because of the thin appendages of the former. These molding conditions and basic formulations are known to those skilled in the art of molding highly plasticized vinyl plastisols.

A variety of vinyl resins and vinyl plastisols can be used in accordance with this invention, for example, low molecular weight polyvinyl chloride, medium molecular weight polyvinyl chloride, blends of low and medium molecular weight polyvinyl chloride, and equivalent vinyl plastisols.

Characteristically these vinyl plastisols are heavily plasticized, e.g., contain from about thirty to about 65 percent by weight, based on total vinyl plastisol formulation, of a plasticizer, such as, dioctyl phthalate, dicapryl phthalate, dioctyl adipate, dioctyl sebacate, mixtures of any two or more of such plasticizers, etc.

Stabilizers, fillers, pigments, gel thixotropic agents, solvents, flow control agents, lubricants and other customary additives can be used in accordance with known molding techniques of such plastisols, e.g., injection molding, rotational molding, etc. Some typical formulae for basic color highly plasticized plastisols are tabulated below:

| COLOR:<br>Component | PLASTISOL FORMULATIONS | | |
|---|---|---|---|
| | BLACK<br>Parts by Weight | NEUTRAL<br>Parts by Weight | WHITE<br>Parts by Weight |
| Vinyl Resin | 34.0 | 100.0 | 34.0 |
| Dioctyl Phthalate | 43.0 | 50.0 | 43.0 |
| Hydrogenated Terphenyl | — | 50.0 | — |
| York Whiting | 19.25 | — | 18.75 |
| Stabilizer* | — | 3.0 | — |
| Silicate White Lead | 2.00 | — | — |
| Carbonate White Lead | — | — | 2.00 |
| Carbon Black | 0.75 | — | — |
| Titanium Dioxide | — | — | 1.25 |
| Stearic Acid | 1.00 | — | 1.00 |

*Argus Chemical "Mark M" and/or Harshaw Chemical "8-V-100"

These three formulations, after blending, can be injected or poured into appropriate shaped molds at low pressures and fused by heating for about ten minutes at approximately 300° F.

Dip coating plastisols, viz., those used for cold dipping, can also be used to constitute the heavily plasticized vinyl plastisol component to form the fishing lures of this invention. A typical dip coating formulation using polyvinyl chloride as the vinyl resin is as follows:

| COMPONENT | PARTS BY WEIGHT |
|---|---|
| Vinyl Resin "Geon 121" | 100.0 |
| Dioctyl Phthalate | 48.0 |
| Dioctyl Sebacate | 24.0 |
| Tri-basic Lead Sulfate | 2.0 |
| Clay | 5.0 |

This formulation is molded by heating at 350° F. for a sufficient time to fuse the components. The time will vary depending on the depth and shape of the mold.

SOFT/VERY SOFT FISHING LURE CONTAINING MICROENCAPSULATED LIQUID FISH ATTRACTANT MOLDING COMPOSITIONS

The compositions used in this invention to form, e.g., mold, these fishing lures contain from about 0.5 weight percent to about 10.0 weight percent of the microencapsulated-containing component and from about 90.0 to 99.5 weight percent of the non-microencapsulated containing (highly plasticized plastisol) component, based on total soft fishing lure molding formulation.

More preferably the liquid fish attractant microencapsulated component concentration ranges from about 0.5 weight percent to about 5.0 weight percent of the molding formulation with the heavily plasticized vinyl plastisol component concentration thereof ranging from about 95.0 to about 99.5 weight percent.

Characteristically the particulate microencapsulated fish attractant containing components utilized to form the lures of this invention are prepared by coacervation microencapsulation of the liquid fish attractant scent within the capsule cell wall material, chemically hardening the microcapsule cell walls and blending the microencapsulated fish attractant component containing the hardened, particulate microencapsulated liquid fish attractant into the continuous binder formulation containing the substantially water-soluble polymeric binder to yield a tacky, viscous formulation which is then blended with the heavily plasticized vinyl component and molded in accordance with known molding procedures as outlined above.

A variety of liquid fish attractant scents can be employed in the present invention provided they are capable of being microencapsulated using a polymeric material which is substantially water soluble and chemically hardenable with a chemical cross linking agent. Suitable exemplary liquid fish attractants include, but are not necessarily limited to, fragrance-oils and scents, such as crayfish oil extract, garlic oil, shrimp oil fragrance, shad oil, blood, banana oil, anise oil (licorice extract), and combinations containing a plurality thereof. The fragrance oils can include similar or dissimilar scents combined to forte liquid fish attractants.

These microencapsulated liquid fish attractant-containing microcapsules can also contain a particulate and/or liquid component(s), to visually appeal to the fish being sought. Such visual fish attractants can include particulate "sparkles" to simulate fish scales released from natural bait fish when excited and liquid soluble fear-simulating substances, which simulate fear reactions occurring in natural bait fish. Other components offering visual attractant appeal to target fish are phosphorescent and/or fluorescent dye(s) and pigments and other dyes and coloring agents enhancing visual appeal.

Suitable chemically hardenable, water-soluble coacervatable microencapsulating materials useful to form the microcapsule solid wall material by coacervation, permitting the incorporation of liquid fish attractant in particulate form in the binder, include natural and synthetic polymers, such as gum arabic, carboxymethyl cellulose, polyvinyl alcohol, methyl cellulose, gelatin, hydroxypropyl cellulose and like materials. The term "coacervation" as used herein means that the microencapsulation takes place by phase separation wherein at least two reactants which are in solution combine to form a hydrophilic composition or compound which surrounds each water-insoluble droplet of fish attractant oil.

Suitable chemical hardening agents which can be used to chemically harden the capsule wall material include, but are not necessarily limited to, the following: glutaraldehyde, formaldehyde and other cross-linking agents well known in the art.

The polymeric binder component used in this invention enables the microencapsulated component to remain reasonably stable in a tacky, viscous state until molded into the appropriate shaped fishing lures. This polymeric binder component constitutes a continuous phase of water-soluble dissolved polymer, e.g., any one, or more, of the natural or synthetic polymers previously set forth above in conjunction with those coacervatable materials and includes gum arabic, carboxymethyl cellulose, polyvinyl alcohol, methyl cellulose, hydroxypropyl cellulose, gelatin, etc.

The continuous phase polymeric binder can include a taste enhancer(s), e.g., salt (NaCl), amino acids, and naturally occurring products.

Such water-soluble binder material can also include, one or more of the above fish-attractant scents; combinations of similar or dissimilar scents; sparkles, dyes, pigments and fear reaction simulating visual attractant materials, etc. When such materials are incorporated in the water-soluble binder, they offer comparatively immediate enticement to the fish upon presentation of the lure in the water.

The microencapsulated liquid fish attractant containing component can include other adjuvant materials as well, e.g., wetting agents; phase inducers promoting coacervation; viscosity control enhancing agents; fragrant oil extenders; polymer solubility enhancers; inverse solubility control agents (to control solubility in relation to the temperature of the water in which fishing is taking place); pH control agents, etc.

PREPARATION OF TYPICAL MICROENCAPSULATED LIQUID FISH ATTRACTANT CONTAINING COMPONENT

Three Hundred Fifteen (315) milliliters (mls.) of anise oil (licorice attractant scent) and 1085 mls. of isopropyl myristate are mixed thoroughly to form what is referred to herein as the internal phase material to be microencapsulated.

Three thousand seven hundred eighty-five grams of deionized water, 70 grams of gelatin and seven grams of carboxyl methyl cellulose are assembled. The water is heated and the gelatin and carboxy methyl cellulose are gradually added to the water with stirring until solution is complete.

The internal phase is added with stirring until the desired oil droplet size is reached.

The entire mixture is then cooled to approximately 10° C. and then 35 mls. of 25-weight percent aqueous glutaraldehyde is added, completing the microcapsule procedure.

To achieve the final product, containing 12 wt. percent capsules, viz., 1470 mls. (315 mls. anise oil plus 1085 mls. isopropyl myristate plus 70 grams of gelatin), 6988 grams of water will be set aside and later added to the 5262 grams from the microencapsulation procedure (not counting glutaraldehyde).

To this set aside water were added 29.4 grams of a commercially available polyvinyl alcohol, marketed under the trade name "71-30" by DuPont Chemical and amounting to two percent by weight of capsules. This water was then heated to 85°–90° C. and maintained for sufficient time to assure solution of the polyvinyl alcohol.

At this elevated temperature a total of 134.7 grams of commercially available hydroxypropyl cellulose marketed under the tradenee "Klucel" (84.2 grams of high viscosity "Klucel H" and 50.5 grams of medium viscosity "Klucel M") were added to achieve a hydroxypropyl cellulose concentration of 1.25 wt. percent based on the total water present in the final formulation. As the polymer solution cools, 2.15 grams of sodium lauryl sulphate was added as a wetting agent to insure good adhesion.

When the polymer solution was sufficiently cool, the microencapsulation mixture was added to it and 245 grams of water-soluble licorice fragrance was added to the whole, viz., two wt. percent of the 12,250 grams. The entire mixture was stirred well to insure a homogenous coating.

Then the pH was raised to 5.5 with a 20 wt. percent sodium hydroxide aqueous solution. After the pH had stabilized at 5.5, 58.8 grams of "Joncryl 74", commercially available acrylic polymer emulsion marketed by Johnson Wax, were added with stirring. So long as the pH of the polymer mix is stabilized at 5.5 before the acrylic polymer emulsion is added, the water-soluble licorice extract can be added before or after the acrylic polymer emulsion.

The micro-encapsulated product was present as discrete particles (spheres) of individual micro-capsules contained as internal phase, the licorice (anise) fish attractant oil scent with extender surrounded by the spherical micro-capsule cell walls. These were particulate and were chemically hardened through the addition of the glutaraldehyde. There were also contained in this micro-encapsulated formulation, agglomerates of individual micro-capsules adhered by their cell walls and each agglomerate containing a plurality thereof present in random distribution along with the individual micro-capsules. The maximum particle size of the individual micro-capsules were characteristically less than one hundred (100) microns.

The mean particle size of the individual micro-capsules present was in the range of about five (5) microns to about one hundred (100) microns, and the concentration of micro-capsules in this typical coating composition, based on total aqueous formulation, was about twelve percent (12%) by weight.

This formulation procedure was chosen using that type of polyvinyl alcohol to insure that the coating would not dissolve too rapidly from the artificial lure once it had been deposited thereupon and permitted to dry. Other concentrations can, of course, be employed as can other grades of polyvinyl alcohol.

It should be noted that both "Klucel H" and "Klucel M" share a common property of wetting out the substrate to be coated very well and both have the property of inverse solubility, viz., they are soluble in cold water but not soluble in hot water. By combining those "Klucels" with polyvinyl alcohol, it was possible to control the solubility of the binder solution to insure that the binder within the molded lures has limited solubility no matter what the temperature of the water may be. This has the effect of permitting the coating to persist within the fishing lure so it will not have to be dissolved out into the water all at one time.

When the above microcapsule-containing component was applied to a variety of soft artificial fishing lures and dried to form a film (coating) thereon, as shown at (16) in FIG. 4; this water-soluble licorice fragrance is locked in the dry film of polyvinyl alcohol and "Klucel". When the bait was thrown into the water and the polymers begin to swell and dissolve, this water-soluble licorice fragrance is released from the film (16) into the water as the bait is being fished.

While the above preparation procedure illustrates the preparation of a typical microencapsulated fish attractant component, it should be realized that the concentration of individual materials therein can be varied. Thus, e.g., the concentration of microencapsulated fish attractant can range from about four (4) to about twenty (20) weight percent, and more usually ranges from about ten (10) to twelve (12) weight percent, based on microencapsulated formulation component.

Similarly the concentration of continuous, substantially water-soluble polymeric binder can typically range from about 0.25 weight percent to about 5.0 weight percent, based on total microencapsulated component aqueous formulation.

With respect to the binder components, about 0.1 to about 0.5 weight percent, and more usually from 0.2 to four weight percent, based on total microencapsulated component formulation, is acrylic polymer, or equivalent; about 0.1 weight percent to about 1.25 weight percent, and more usually from 0.2 to 1.0 weight percent, based on total microencapsulated component formulation, is polyvinyl alcohol, or equivalent; and from about 0.4 weight percent to about 2.25 weight percent, and more usually from 0.6 weight percent to 2.0 weight percent, based on total microencapsulated component formulation, is hydroxypropyl cellulose, or its equivalent.

I claim:

1. A soft plastic fishing lure containing individual microcapsules of particulate micro-encapsulated liquid fish attraction wherein the predominant portion of said microcapsules range in particle size from about 5 microns to about 100 microns.

2. A soft fishing lure as in claim 1 wherein the major component of said lure is a heavily plasticized vinyl plastisol and the minor component thereof is said particulate microencapsulated liquid fish attractant in a tacky, viscous, continuous, substantially water-soluble polymeric binder.

3. A soft fishing lure as in claim 2 wherein said microencapsulated fish attractant has individual microcapsules, each having a spherical cell wall of natural or synthetic coacervated polymer.

4. A soft plastic fishing lure as in claim 3 wherein the predominant portion of said individual microcapsules range in particle size from about thirty (30) microns to about seventy (70) microns.

5. A soft plastic fishing lure as in claim 3 which includes agglomerates of said individual microcapsules adhered by their respective cell walls.

6. A soft heavily plasticized vinyl plastisol fishing lure containing particulate individual microcapsules comprised of a cell wall of coacervated natural or synthetic polymer containing liquid fish attractant wherein a predominant portion of said microcapsules have a particle size ranging from about 5 microns to about 100 microns and are associated in a tacky, viscous, continuous, water-soluble polymeric binder.

7. A soft heavily plasticized vinyl plastisol fishing lure as in claim 6 containing from about 0.5 weight percent to about 10.0 weight percent of said particulate microcapsules and said binder and from about 90.0 to 99.5 weight percent of said heavily plasticized vinyl plastisol.

8. A soft heavily plasticized vinyl plastisol fishing lure as in claim 7 wherein the concentration of said particulate microcapsules and said binder ranges from about 0.5 weight percent to about 5.0 weight percent and the concentration of said heavily plasticized vinyl plastisol ranges from about 95.0 weight percent to about 99.5 weight percent.

9. A soft heavily plasticized vinyl plastisol fishing lure as in claim 6 including agglomerates of said individual microcapsules adhered by their respective cell walls.

10. A soft heavily plasticized vinyl plastisol fishing lure as in claim 9 wherein the predominant portion of said individual microcapsules range in particle size from about thirty (30) microns to about seventy (70) microns.

11. A soft heavily plasticized molded fishing lure containing a major proportion of a heavily plasticized vinyl plastisol and a minor proportion of particulate individual microcapsules having a particle size ranging from about 5 microns to about 100 microns and comprised of a cell wall of coacervated natural or synthetic polymer containing liquid fish attractant associated in a tacky, viscous, continuous, water-soluble polymeric binder.

12. A soft heavily plasticized molded fishing lure as in claim 11 containing an adherent dried film of water-soluble polymeric binder containing particulate individual microcapsules having a particle size ranging from about 5 microns to about 100 microns and containing liquid fish attractant on the outside thereof.

* * * * *